(12) United States Patent
Komaki et al.

(10) Patent No.: US 11,016,295 B2
(45) Date of Patent: May 25, 2021

(54) EYEGLASSES WEARABLE DEVICE, METHOD OF CONTROLLING THE EYEGLASSES WEARABLE DEVICE AND DATA MANAGEMENT SERVER

(71) Applicant: KABUSHIKI KAISHA TOSHIBA, Tokyo (JP)

(72) Inventors: Hiroaki Komaki, Tachikawa Tokyo (JP); Akira Tanaka, Mitaka Tokyo (JP); Kenichi Doniwa, Asaka Saitama (JP); Hiroki Kumagai, Kunitachi Tokyo (JP); Takashi Sudo, Fuchu Tokyo (JP); Yasuhiro Kanishima, Tokyo (JP); Nobuhide Okabayashi, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 355 days.

(21) Appl. No.: 14/979,197

(22) Filed: Dec. 22, 2015

(65) Prior Publication Data

US 2017/0059865 A1 Mar. 2, 2017

(30) Foreign Application Priority Data

Sep. 1, 2015 (JP) .............................. JP2015-172230

(51) Int. Cl.
*G09B 5/02* (2006.01)
*G02B 27/01* (2006.01)
(Continued)

(52) U.S. Cl.
CPC ........... *G02B 27/017* (2013.01); *G06F 1/163* (2013.01); *G06F 3/013* (2013.01); *G09B 5/02* (2013.01);
(Continued)

(58) Field of Classification Search
CPC .............. G02B 27/017; G02B 27/0172; G02B 2027/0178; G02B 5/125; G02B 5/02;
(Continued)

(56) References Cited

U.S. PATENT DOCUMENTS

| 8,059,136 B2 * | 11/2011 | Mathan | G06K 9/00637 345/581 |
| 2006/0061544 A1 * | 3/2006 | Min | G02B 27/0093 345/156 |

(Continued)

FOREIGN PATENT DOCUMENTS

| JP | H05-211650 A | 8/1993 |
| JP | H10-147411 A | 6/1998 |

(Continued)

*Primary Examiner* — Michael C Grant
(74) *Attorney, Agent, or Firm* — Rutan & Tucker, LLP

(57) ABSTRACT

According to one embodiment, an eyeglasses wearable device includes a sensing signal acquisition module configured to acquire sensing signals from potential sensors, a display configured to display display data, a display data output module configured to transmit first display data to the display, a characteristic determination module configured to determine at least timing of blinking of the user based on variations in the sensing signals when the first display data is displayed on the display, and an oversight determination module configured to determine whether the user has overlooked an important display position in the first display data by comparing the timing of blinking with an elapsed time position of the first display data.

20 Claims, 13 Drawing Sheets

(51) Int. Cl.
  *G06F 3/01* (2006.01)
  *G09B 5/12* (2006.01)
  *G06F 1/16* (2006.01)

(52) U.S. Cl.
  CPC ........ *G09B 5/125* (2013.01); *G02B 2027/014* (2013.01); *G02B 2027/0178* (2013.01); *G02B 2027/0187* (2013.01)

(58) Field of Classification Search
  CPC ...... G02B 2027/0187; G02B 2027/014; G06F 3/015; G06F 1/163; G06F 3/013; G09B 5/125; G09B 5/02
  USPC .......................................................... 434/219
  See application file for complete search history.

(56) References Cited

U.S. PATENT DOCUMENTS

| | | | | |
|---|---|---|---|---|
| 2007/0173699 | A1* | 7/2007 | Mathan | G06K 9/00496 600/300 |
| 2007/0236488 | A1* | 10/2007 | Mathan | G06K 9/00536 345/418 |
| 2009/0195351 | A1 | 8/2009 | Takeda et al. | |
| 2011/0170067 | A1* | 7/2011 | Sato | A61B 5/0496 351/209 |
| 2011/0178784 | A1* | 7/2011 | Sato | A61B 5/0496 703/2 |
| 2013/0106674 | A1* | 5/2013 | Wheeler | G02B 27/017 345/8 |
| 2013/0216995 | A1* | 8/2013 | Yoon | G09B 5/00 434/365 |
| 2013/0226845 | A1* | 8/2013 | Gobert | G09B 7/04 706/12 |
| 2013/0242077 | A1* | 9/2013 | Lin | A61B 3/113 348/78 |
| 2013/0323694 | A1* | 12/2013 | Baldwin | G09B 17/00 434/178 |
| 2014/0126782 | A1* | 5/2014 | Takai | G06K 9/0061 382/116 |
| 2014/0132484 | A1* | 5/2014 | Pandey | G02B 27/0172 345/8 |
| 2014/0145079 | A1 | 5/2014 | Omino | |
| 2014/0240484 | A1 | 8/2014 | Kodama et al. | |
| 2014/0292637 | A1* | 10/2014 | Peng | G02B 27/0172 345/156 |
| 2014/0351191 | A1 | 11/2014 | Kon et al. | |
| 2015/0070273 | A1* | 3/2015 | He | G06F 3/013 345/156 |
| 2015/0079560 | A1* | 3/2015 | Cowan | A61B 5/742 434/236 |
| 2015/0092050 | A1* | 4/2015 | Cho | A61B 5/7405 348/143 |
| 2015/0125842 | A1* | 5/2015 | Shim | G06F 21/31 434/322 |
| 2015/0126845 | A1* | 5/2015 | Jin | G02B 27/017 600/383 |
| 2015/0145670 | A1* | 5/2015 | Tsuruoka | H04M 1/6066 340/539.11 |
| 2016/0022136 | A1* | 1/2016 | Ettenhofer | A61B 3/113 600/301 |
| 2016/0033772 | A1* | 2/2016 | Han | H04N 1/6083 359/630 |
| 2016/0041614 | A1* | 2/2016 | Mok | G06F 3/013 345/156 |
| 2016/0054794 | A1* | 2/2016 | Yu | G06F 3/013 345/156 |
| 2016/0132107 | A1 | 5/2016 | Kanishima et al. | |
| 2016/0247322 | A1 | 8/2016 | Komaki | |
| 2017/0115742 | A1* | 4/2017 | Xing | G06F 3/012 |
| 2017/0150898 | A1* | 6/2017 | Liu | A61B 5/0496 |

FOREIGN PATENT DOCUMENTS

| | | |
|---|---|---|
| JP | 2000-354943 A | 12/2000 |
| JP | 2002-288294 A | 10/2002 |
| JP | 2003-196681 A | 7/2003 |
| JP | 2003-216687 A | 7/2003 |
| JP | 2004-102727 A | 4/2004 |
| JP | 2009-187117 A | 8/2009 |
| JP | 2009-279193 A | 12/2009 |
| JP | 2010-271928 A | 12/2010 |
| JP | 2011-081737 A | 4/2011 |
| JP | 2011-118683 A | 6/2011 |
| JP | 2012-212991 A | 11/2012 |
| JP | 2013-020422 A | 1/2013 |
| JP | 2013-244370 A | 12/2013 |
| JP | 2014-164482 A | 9/2014 |
| JP | 2014-228725 A | 12/2014 |
| JP | 2015-075832 A | 4/2015 |
| JP | 2015-088175 A | 5/2015 |

\* cited by examiner (A)

(B)

(C)

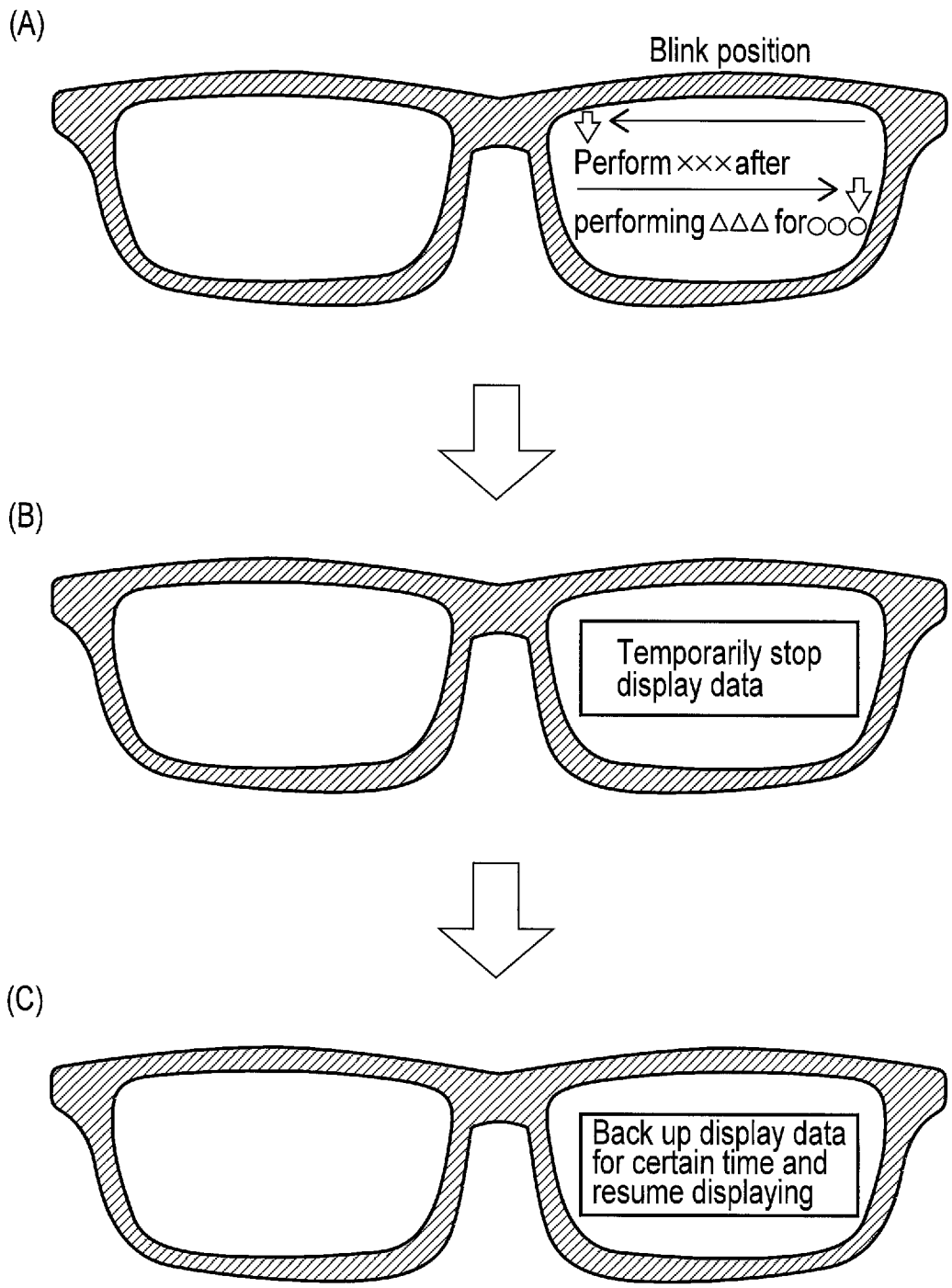
F I G. 13

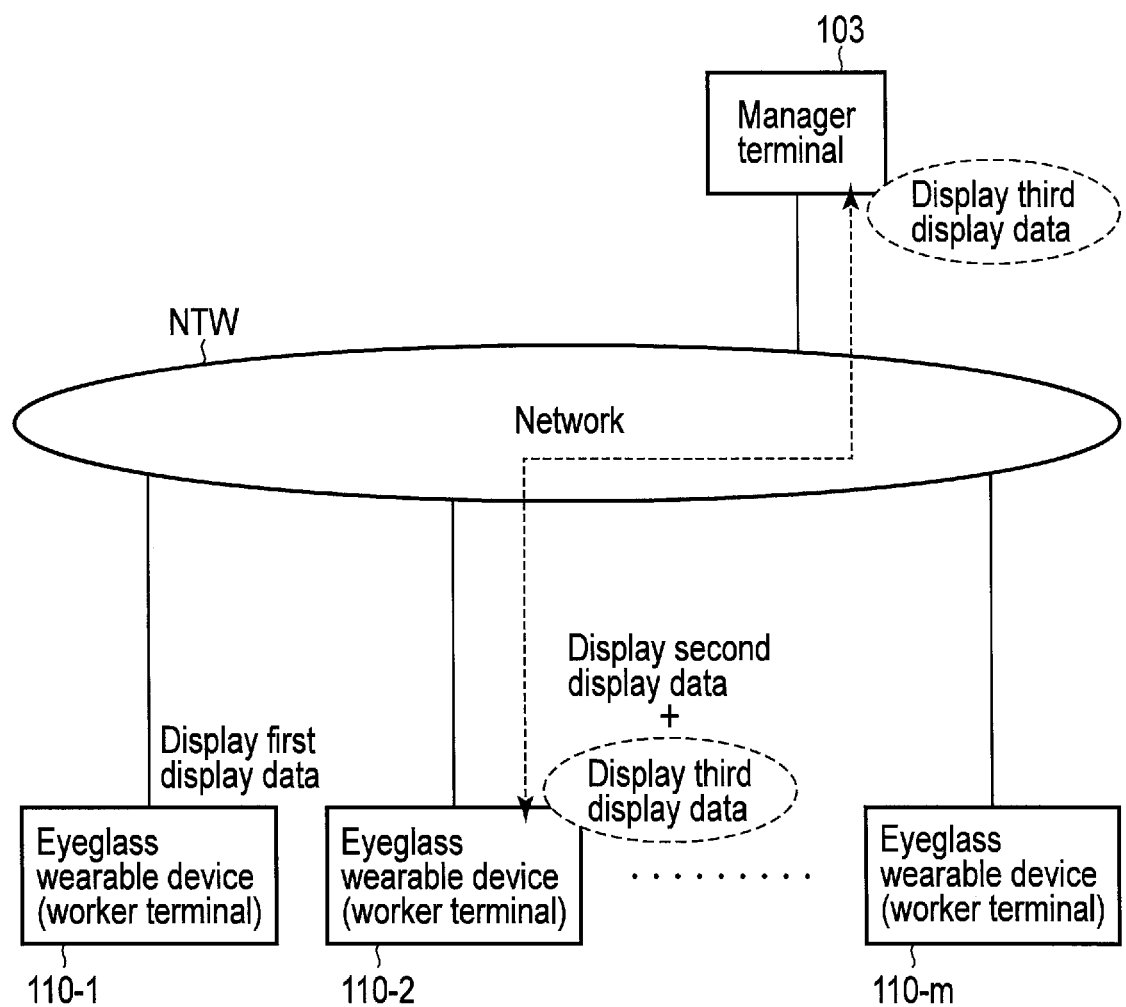
F I G. 14

EYEGLASSES WEARABLE DEVICE, METHOD OF CONTROLLING THE EYEGLASSES WEARABLE DEVICE AND DATA MANAGEMENT SERVER

CROSS-REFERENCE TO RELATED APPLICATIONS

This application is based upon and claims the benefit of priority from Japanese Patent Application No. 2015-172230, filed Sep. 1, 2015, the entire contents of which are incorporated herein by reference.

FIELD

Embodiments described herein relate generally to a data processor of an eyeglasses wearable device, a method of controlling the eyeglasses wearable device and a data management server.

BACKGROUND

A technique for improving working efficiency through the use of a wearable device capable of providing information such as various moving images and messages in front of user's eyes is known. A technique for improving working efficiency by displaying the progress of work of users working by means of wearable devices on the display of each wearable device such that each user can easily understand the progress of work of the other users is disclosed.

A technique of sensing a sight-line by means of a wearable device is also known. Electro-oculography (EOG) is one of a number of electrical methods for sensing a sight-line. In EOG, the sight-line of the user of a wearable device is sensed by using the eye's property of the cornea being positively charged and the retina being negatively charged, by placing electrodes around the eyes and measuring variations in potential caused by eye movements.

As the technique to measure an ocular potential, for example, a method for reducing user discomfort caused by the contact of electrodes with the skin by placing the electrodes in the nose pads of eyeglasses is disclosed. This technique allows the user to use the eyeglasses equipped with electrodes without discomfort.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 13 is an illustration showing an example of the display data displayed on the display based on the result of the oversight determination process by the eyeglasses wearable device of the embodiment.

FIG. 14 is a diagram showing an example of sharing the data displayed on the display of the eyeglasses wearable device of the embodiment with users of other eyeglasses wearable devices via a network.

DETAILED DESCRIPTION

Various embodiments will be described hereinafter with reference to the accompanying drawings. These embodiments may relate to various wearable devices including any of an eyeglasses wearable device, a glasses wearable device, a spectacle wearable device, and the like. In this specification (including detailed description and claims) these various wearable devices are simply represented by the term "eyeglasses wearable device" unless otherwise noted. In other words, the term "eyeglasses wearable device" should be broadly interpreted as a wearable device regarding an eye or eyes.

In general, according to one embodiment, an eyeglasses wearable device comprises: a sensing signal acquisition module configured to acquire sensing signals from potential sensors configured to sense potentials around eyes of a user; a display located at a predetermined position in front of the eyes of the user and configured to display display data; a display data output module configured to transmit first display data which varies with time to the display; a characteristic determination module configured to determine at least timing of blinking of the user based on variations in the sensing signals acquired by the sensing signal acquisition module when the first display data is displayed on the display; and an oversight determination module configured to determine whether the user has overlooked an important display position in the first display data by comparing the timing of blinking with elapsed time of the first display data.

Figure 1:
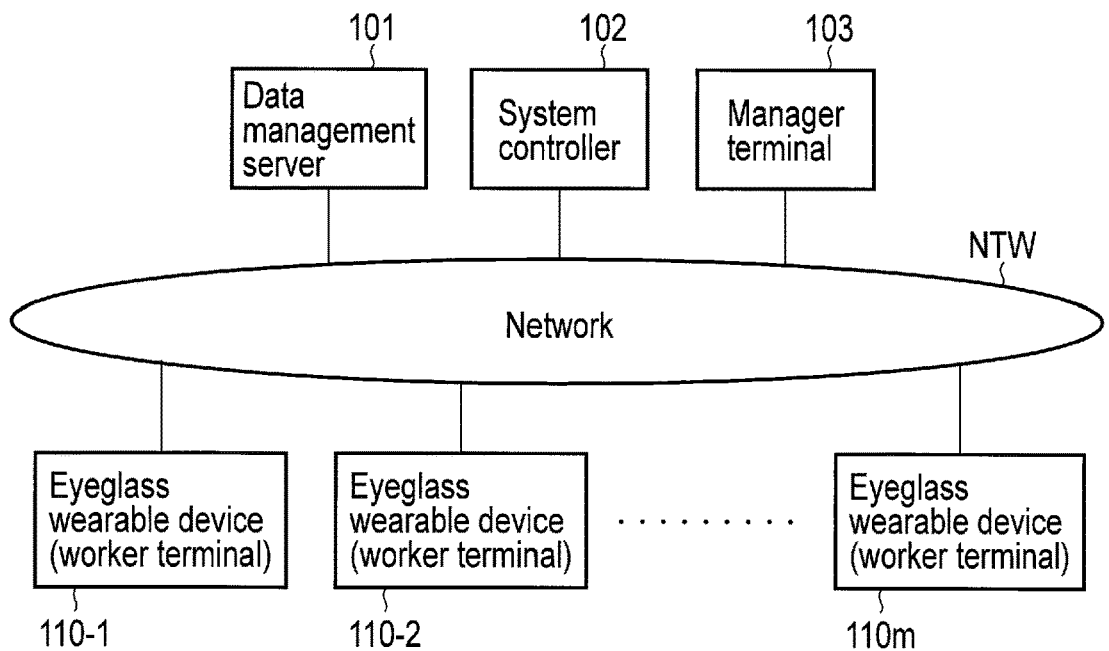
FIG. 1 is a schematic view showing an example of an eyeglasses wearable device of an embodiment and a system to recognize the eyeglasses wearable device.

FIG. 1 is a schematic view showing an example of an eyeglasses wearable device of the embodiment and a system to recognize the eyeglasses wearable device.

A manager terminal 103, eyeglasses wearable devices 110-1 to 110-m serving as worker terminals, a data management server 101 and a system controller 102 can transmit signals to and receive signals from each other via a network NTW.

The communication between the system controller 102 (or data management server 101) and the manager terminal 104 and each of eyeglasses wearable devices 110-1 to 110-m may be wired or wireless, and should preferably be short-range wireless communication conforming to IEEE802.11 (b/g), for example, Bluetooth (registered trademark).

Figure 2:
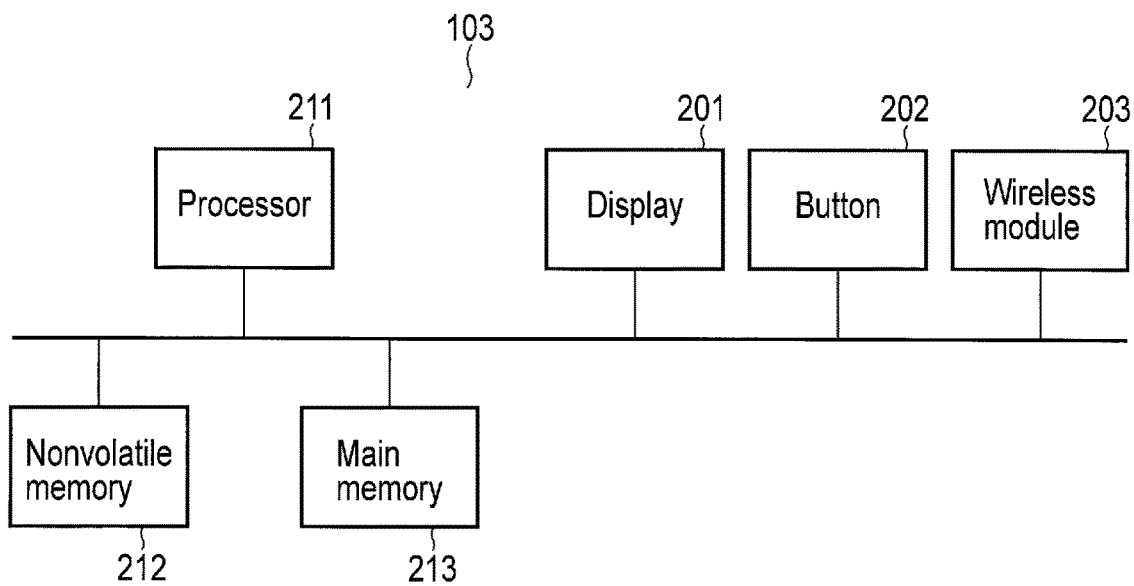
FIG. 2 is a diagram showing an example of a system configuration of a manager terminal in the system to recognize the eyeglasses wearable device of the embodiment.

FIG. 2 is a schematic view showing an example of a system of the manager terminal 103. As shown in FIG. 2, for example, the manager terminal 103 comprises a processor 211, a nonvolatile memory 212, a main memory 213, a display 201, a button 202, a wireless module 203 and the like. The display 201 is a display configured to show information to a manager. The button 202 is a button for the operation of the terminal by the manager. The processor 211 is a processor configured to control the manager terminal 103 and executes various types of software loaded from the nonvolatile memory 212 into the main memory 213.

Figure 3:
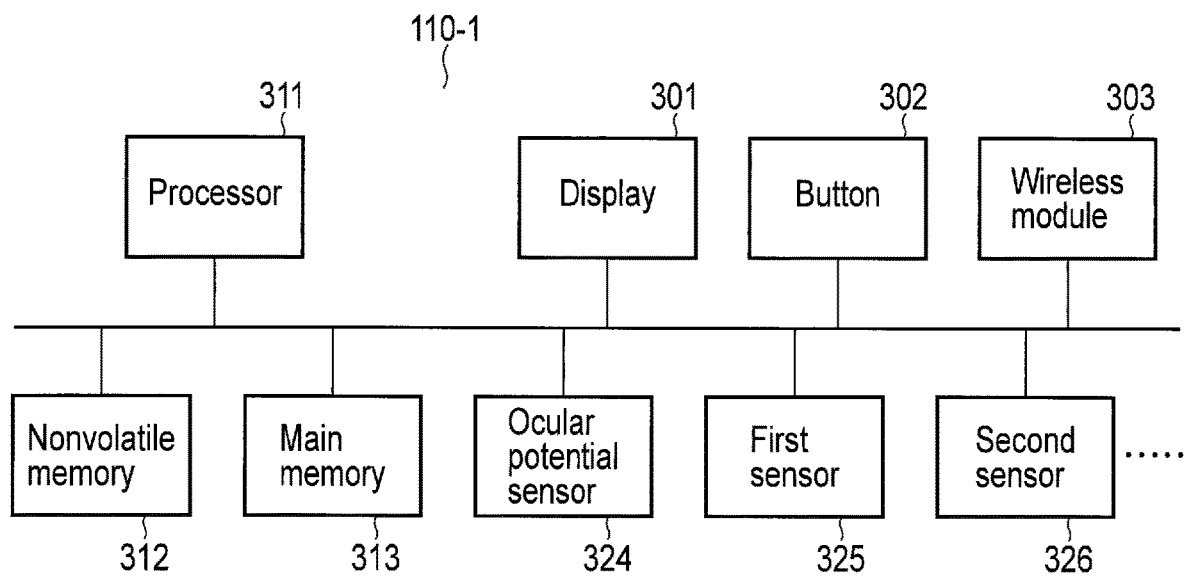
FIG. 3 is a diagram showing an example of a system configuration of the eyeglasses wearable device of the embodiment.

FIG. 3 is a schematic view showing an example of a system of eyeglasses wearable devices (worker terminals) 110-1 to 110-m. Since these eyeglasses wearable devices have the same structure, eyeglasses wearable device 110-1 is hereinafter described as a representative. A display 301 is located in front of the eyes of a user of eyeglasses wearable device 110-1. For example, the display 301 can be obtained by attaching a liquid crystal film to the lenses of eyeglasses wearable device 110-1. The display 301 can display various types of information by using the liquid crystal. A button 302 is a button for the operation of the terminal by the worker. A processor 311 is a processor configured to control eyeglasses wearable device (worker terminal) 110-1 and executes various types of software loaded from a nonvolatile memory 312 to a main memory 313.

An ocular potential sensor 324 is a sensor configured to measure ocular potential. The ocular potential sensor 324 comprises sensing electrodes for sensing the user's ocular potential. The sensing electrodes are provided on an insulator (dielectric). Metal, conductive plastic and the like in contact with the nose of the user wearing eyeglasses wearable device 110-1 may be used for each sensing electrode.

A sensing signal waveform from the sensing electrodes (for example, signal waveform corresponding to a potential difference between the sensing electrodes) varies according to eye movements (vertical and horizontal eye movement, blinking, closing the eyes, winking and the like) of the user wearing eyeglasses wearable device 110-1. The user's eye movements can be estimated by monitoring such variations in waveform.

In order to specify eye movements, a camera or an infrared radiation sensor may be used, but the ocular potential sensor 324 is used in the present invention.

Figure 4:
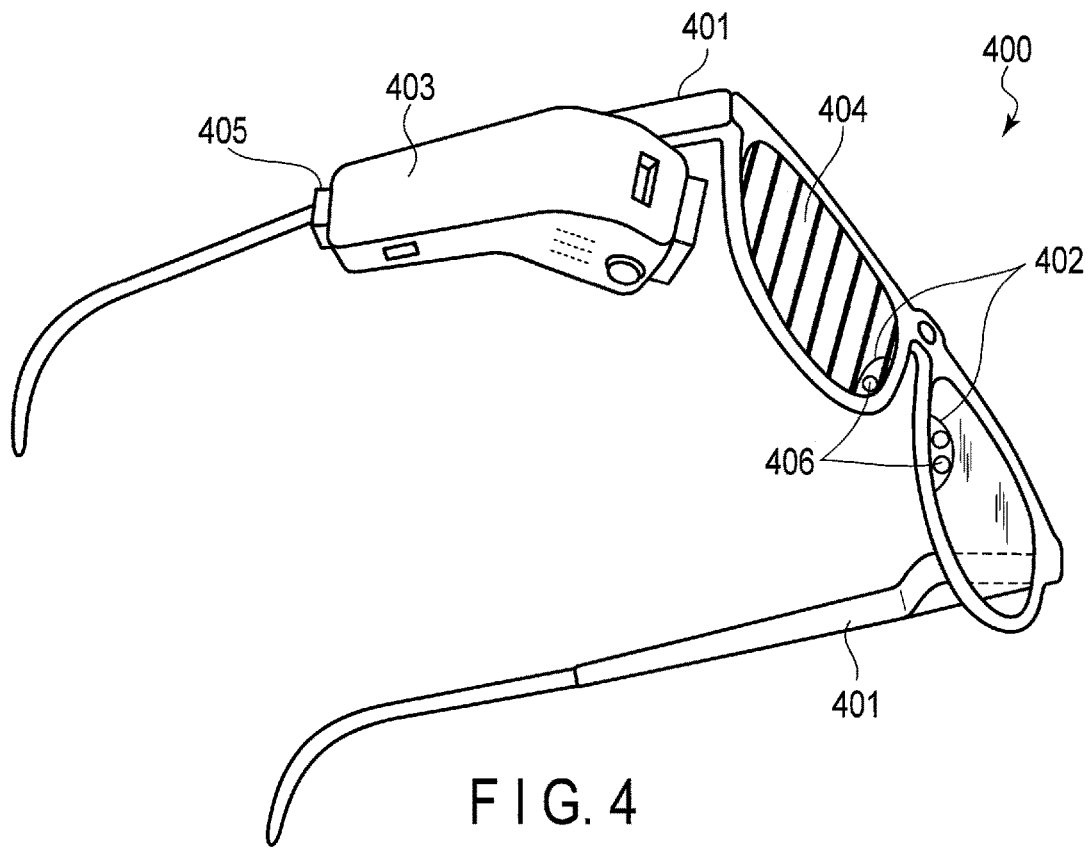
FIG. 4 is a perspective view showing an example of the eyeglasses wearable device of the embodiment.

FIG. 4 is a perspective view showing an example of eyeglasses wearable device 110-1 of the present embodiment. An eyeglasses wearable device 400 shown in FIG. 4 comprises a frame portion 401 provided at the position of the right and left eyes, and a nose pad portion 402 provided at the position of the nose. The eyeglasses wearable device 400 comprises an electronic device 403, a display 404 and a wireless module 405 in the frame portion 401, and comprises the ocular potential sensor 406 in the nose pad portion 402. In the example illustrated, the display 404 is formed by attaching a liquid crystal film to the right eyepiece of the eyeglasses wearable device 400. The processor 311, the nonvolatile memory 312 and the main memory 313 are included in the electronic device 403.

Figure 5:
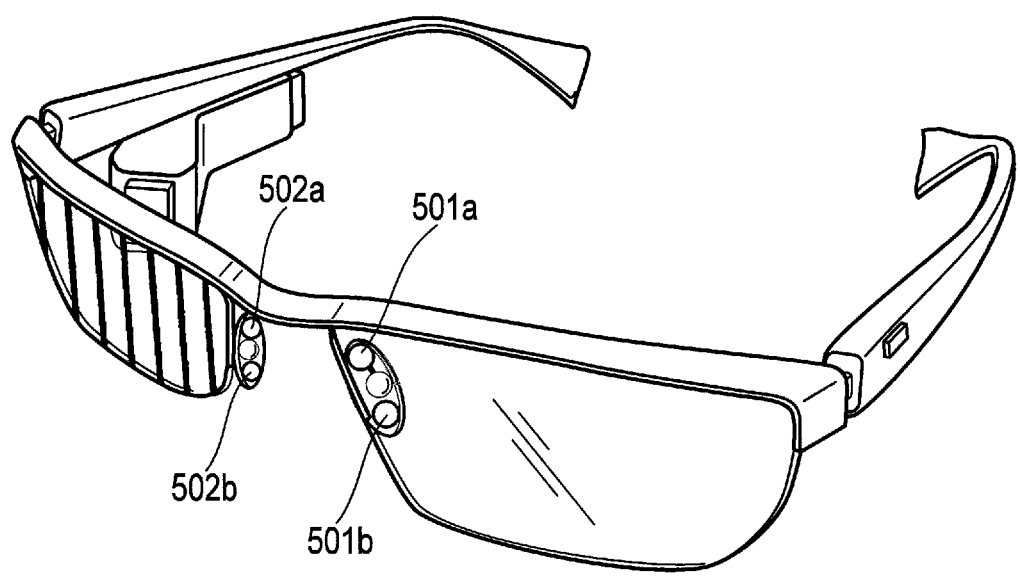
FIG. 5 is a perspective view showing an example of positions of sensing electrodes of an ocular potential sensor provided in the eyeglasses wearable device of the embodiment.

FIG. 5 shows an example of positions of sensing electrodes (501a, 501b, 502a and 502b) of the ocular potential sensor 406 provided in eyeglasses wearable device 400. The sensing electrodes for sensing ocular potential, which are directly in contact with the user, are placed only in the nose pad portion. Even in ordinary eyeglasses, nose pads are in contact with the user. Thus, when the user wears eyeglasses wearable device 400 in which the sensing electrodes for sensing ocular potential directly in contact with the user are provided only in the nose pad portion, the user feels almost no discomfort as if wearing ordinary eyeglasses. Therefore, working efficiency is almost never decreased when the user works with eyeglasses wearable device 100 in which sensing electrodes for sensing ocular potential are provided only in a nose pad portion.

FIG. 6(A) to FIG. 6(D) show an example of variations in ocular potential signal measured by the ocular potential sensor 406 caused by eye movements of the user of eyeglasses wearable device 400.

Figure 6:
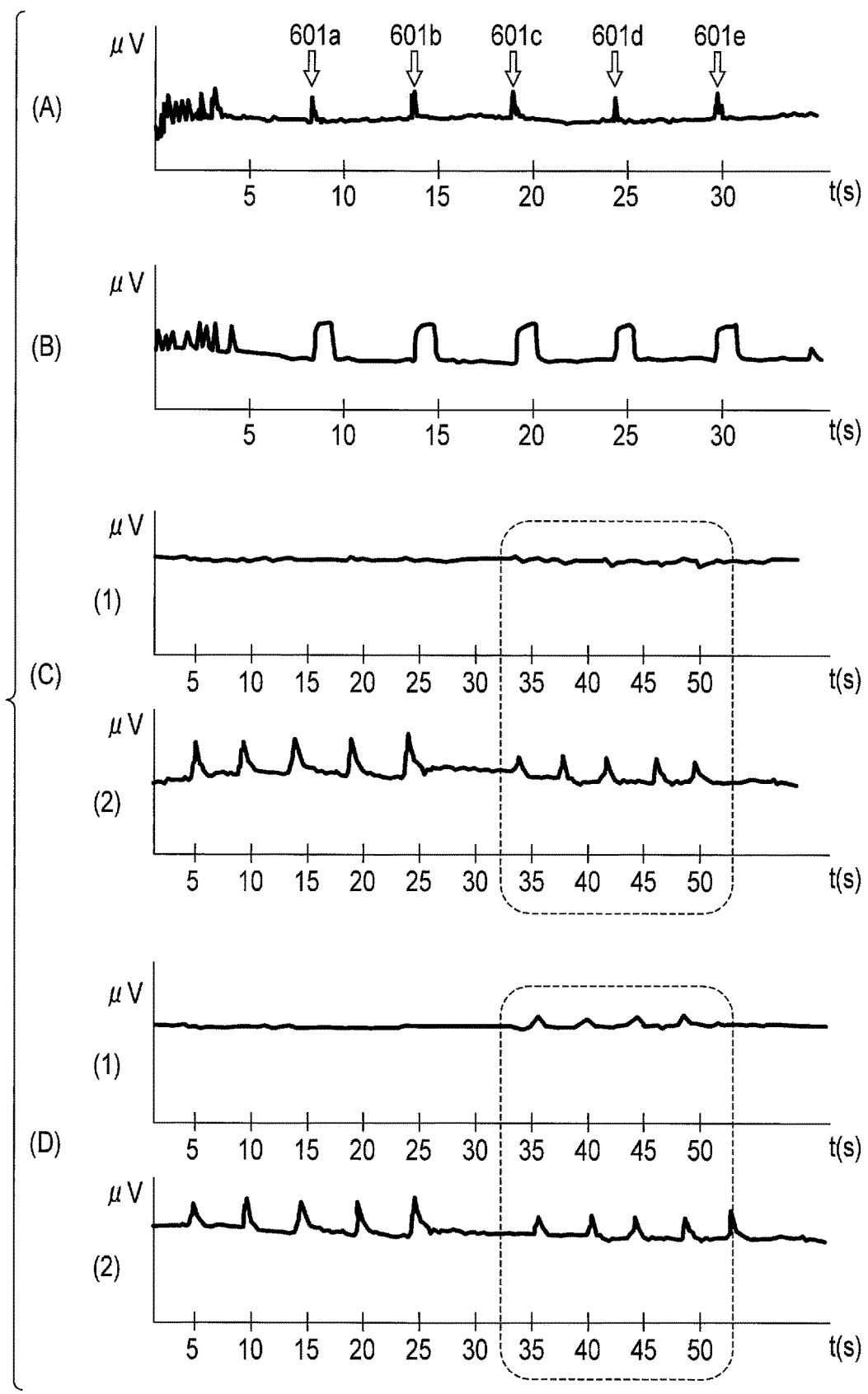
FIG. 6 is a waveform chart showing examples of variations in an ocular potential sensing signal caused by eye movements of the user of the eyeglasses wearable device of the embodiment.

FIG. 6(A) is a chart showing variations in sensing signal of ocular potential in the case where the user blinks five times while looking to the front. When the user closes the eyes, the eyes are turned upward. Therefore, when the user blinks, the eyes are turned upward momentarily. At that moment, in a pair of electrodes (501a and 501b) arranged one above the other to sense vertical eye movements, electrode 501a is at a positive potential relative to a potential of electrode 501b. As a result, a waveform of the sensing signal of ocular potential has a triangular shape at each moment when the user blinks, as indicated by arrows (601a, 601b, 601c, 601d and 601e) in FIG. 6(A). In a pair of electrodes (502a and 502b) arranged one above the other to sense vertical eye movements, too, a potential of electrode 502a varies in a similar way as the pair of electrodes (501a and 501b) relative to a potential of electrode 502b.

FIG. 6(B) is a chart showing variations in sensing signal of ocular potential in the case where the user closes the eyes (for one second) five times while looking to the front. While the user is closing the eyes, the eyes are kept turned upward. As a result, the sensing signal of ocular potential is continuously at a level higher than a reference level and a waveform of the signal has a rectangular shape while the user is closing the eyes.

FIG. 6(C) is a chart showing variations in sensing signal of ocular potential in the case where the user blinks five times and then winks the left eye five times while looking to the front. FIG. 6(D) is a chart showing variations in sensing signal of ocular potential in the case where the user blinks five times and then winks the right eye five times while looking to the front. FIG. 6(C)-(1) and FIG. 6(D)-(1) show variations in sensing signal of ocular potential of obtained by a pair of horizontally arranged electrodes (501a and 502a). FIG. 6(C)-(2) and FIG. 6(D)-(2) show variations in sensing signal of ocular potential obtained by a pair of vertically arranged electrodes (501a and 501b).

Which of the eyes is closed by the user can be sensed from the variations in sensing signal obtained by the pair of horizontally arranged electrodes (501a and 502a). The areas surrounded by the dotted lines in FIG. 6(C) and FIG. 6(D) indicate that the user winks. In these areas, the sensing signal obtained by the pair of vertically arranged electrodes (501a and 501b) has a triangular waveform as in the case where the user blinks, as shown in FIG. 6(C)-(2) and FIG. 6(D)-(2). When the user winks the left eye, the waveform of the sensing signal obtained by the pair of horizontally arranged electrodes (501a and 502a) has slightly dented portions as shown in FIG. 6(C)-(1). When the user winks the right eye, the waveform of the sensing signal obtained by the pair of electrodes (501a and 502a) has slightly protruding portions as shown in FIG. 6(D)-(1). By measuring such variations in sensing signal, eye movements such as vertical and horizontal eye movement, blinking, closing the eyes, winking and the like can be estimated. In addition, a sight-line of the user of eyeglasses wearable device 400 can also be estimated based on a result of the estimation of eye movement.

Figure 7:
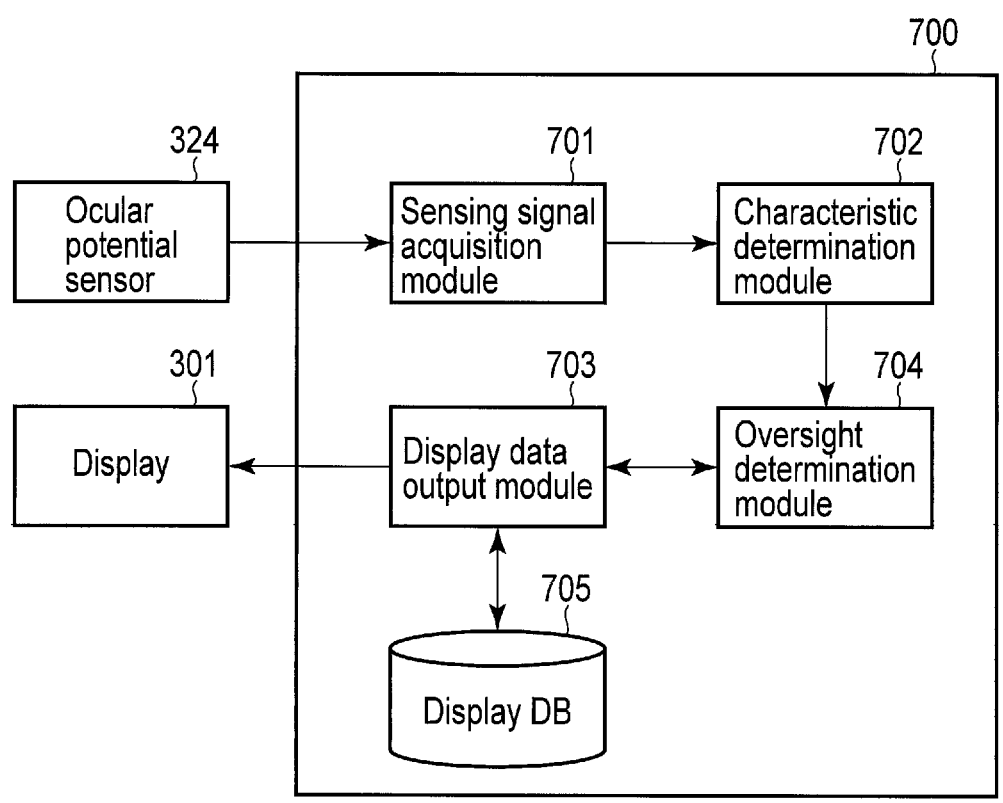
FIG. 7 is a block diagram mainly showing an example of a function structure of the eyeglasses wearable device of the embodiment.

FIG. 7 is a block diagram mainly showing a function structure of eyeglasses wearable device 400. In FIG. 7, the reference number 700 represents a sensing signal response processing module. Eyeglasses wearable device 400 of the present invention has a function of estimating the frequency of blinking of the user of eyeglasses wearable device 400 based on variations in ocular potential sensed by the ocular potential sensor 324 and displaying display data on the display 301 according to a result of the estimation to issue an instruction to the working user. As shown in FIG. 7, eyeglasses wearable device 400 comprises a sensing signal acquisition module 701, a characteristic determination module 702, a display data output module 703, an oversight determination module 704 and display DB 705.

All or part of the sensing signal acquisition module 701, the characteristic determination module 702, the display data output module 703 and the oversight determination module 704 may be realized by causing the processor 311 to execute a program, by hardware such as an integrated circuit (IC) or by the combination of software and hardware.

The sensing signal acquisition module 701 acquires a sensing signal of ocular potential sensed by the ocular potential sensor 324. The sensing signal acquisition module 701 acquires the sensing signal of ocular potential at predetermined intervals and transmits the sensing signal of the ocular potential to the characteristic determination module 702 each time the sensing signal is acquired.

The characteristic determination module 702 stores the sensing signals of ocular potential transmitted from the sensing signal acquisition module 701 along a time axis and specifies the timing at which the user blinks by monitoring variations in the sensing signals.

The display data output module 703 outputs data, which is to be recognized as information about work by the user working with eyeglasses wearable device 400, to the display 301. The information about work is, for example, a manual image or an instruction based on a result of the determination by the oversight determination module 704. Such display data is stored in the display DB 705. The data in the display DB 705 can be updated by the wireless module 405 via the network in accordance with instructions by the system controller 102.

The oversight determination module 704 checks the display data output by the display data output module 703 at the timing of the user's blinking determined by the characteristic determination module 702, and determines whether the user has overlooked an important display position in the display data. The characteristic determination module 702 can also detect a blink pattern from the timing of the user's blinking reported by the characteristic determination module 702 and determine whether the user has overlooked the important display position in the display data in consideration of the blink pattern, which will be described later.

The sensing signal response processing module 700 is provided in eyeglasses wearable device 400 in the above description, but may be provided in the system controller 102 shown in FIG. 1. In this case, the sensing signal from the ocular potential sensor 324 and the display data to be displayed on the display module 301 are transmitted between the system controller 102 and eyeglasses wearable device 400 by the wireless module 405.

Figure 8:
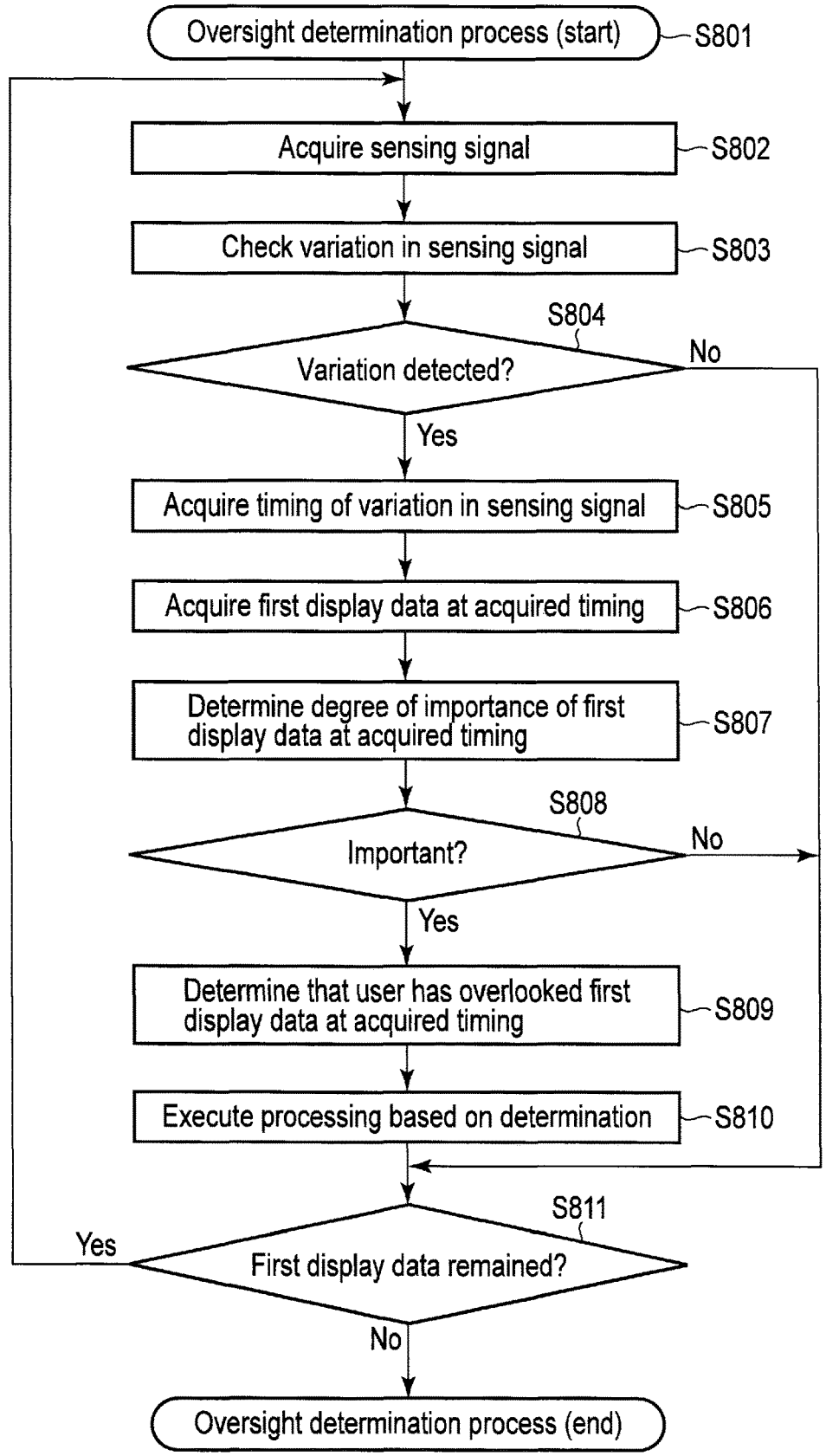
FIG. 8 is a flowchart showing an example of a flow of an oversight determination process by the eyeglasses wearable device of the embodiment.

FIG. 8 is a flowchart showing an example of a flow of an oversight determination process by eyeglasses wearable device 400 of the embodiment. When the display data output module 703 starts outputting display data to be displayed on the display 301, the oversight determination process is started (S801). The sensing signal acquisition module 701 acquires a sensing signal of ocular potential from the ocular potential sensor 324 (S802).

The sensing signal of ocular potential is transmitted to the characteristic determination module 702 each time the sensing signal is acquired. The characteristic determination module 702 stores the transmitted sensing signals of ocular potential along the time axis and checks any temporal variation (S803). If the characteristic determination module 702 detects a variation in sensing signal of ocular potential (S804), the characteristic determination module 702 reports the timing of the variation in sensing signal of ocular potential to the oversight determination module 704. The oversight determination module 704 acquires the timing of the variation in sensing signal of ocular potential (S805), acquires the display data output to the display 301 by the display data output module 703 at the acquired timing (S806), and determines a degree of importance of the display data (S807).

If the oversight determination module 704 determines that the display data is important in S808, the oversight determination module 704 determines that the user of eyeglasses wearable device 400 has overlooked the display data at the timing acquired in S806 (S809). The oversight determination module 704 executes processing based on the determination that the user has overlooked the data (S810).

As the processing based on the determination that the user has overlooked the data, for example, the oversight determination module 704 instructs the display data output module 703 to display second display data different from the display data currently displayed on the display 301 by the display data output module 703. In response to the instruction, the display data output module 703 outputs the second display data to display the second display data on the display 301.

In this manner, a mental condition of the user of eyeglasses wearable device 400 and a condition of oversight in the display data can be estimated in real time based on the timing of the user's blinking, and the information shown to the user can be added and changed in real time based on a result of the estimation.

In the flow shown in FIG. 8, the oversight determination module 704 performs the oversight determination process each time the characteristic determination module 702 reports the timing of blinking. However, the oversight determination module 704 may monitor the timing of blinking reported by the characteristic determination module 702 for a certain time, detect a blink pattern from the timing of blinking monitored for the certain time and perform the oversight determination process by using the detected blink pattern.

Figure 9:
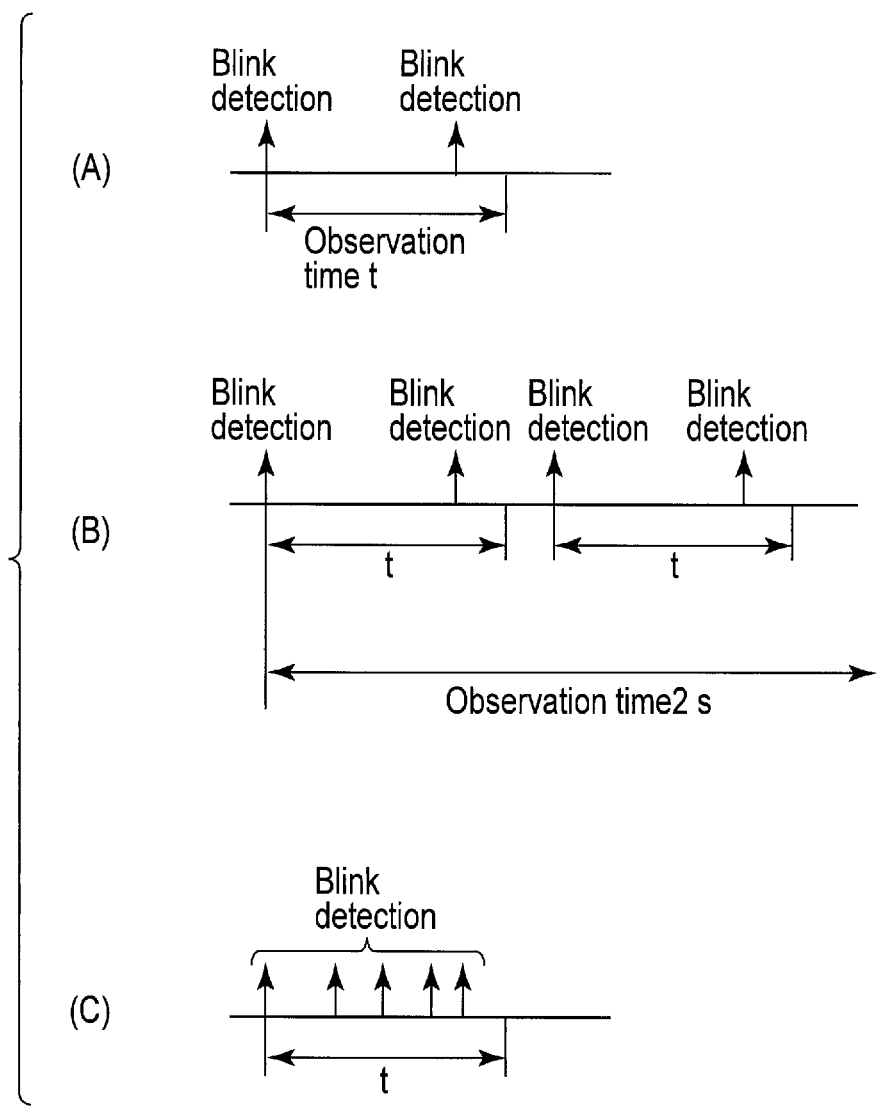
FIG. 9 is an illustration showing an example of blink patterns used in the oversight determination process by the eyeglasses wearable device of the embodiment.

FIG. 9(A) to FIG. 9(C) show an example of blink patterns used in the oversight determination process by the oversight determination module 704.

For example, the following three blink patterns are used:

(1) Blink Pattern 1

After a blink is detected, the number of blinks within observation time=t is less than m (m>0).

(2) Blink Pattern 2

After a blink is detected, the number of blinks within observation time=t is less than m (m>0), and this condition is continuously repeated n times or more within observation time 2 s.

(3) Blink Pattern 3

After a blink is detected, the number of blinks within observation time=t is greater than or equal to m (m>0).

Blink patterns 1, 2 and 3 are shown in FIG. 9(A), FIG. 9(B) and FIG. 9(C), respectively.

With respect to the blink patterns, the oversight determination module 704 determines as follows:

(1) Determination in the Case of Blink Pattern 1 (Determination Pattern 1)

The user does not blink (the user sustains concentration).

(2) Determination in the Case of Blink Pattern 2 (Determination Pattern 2)

The user blinks (the user starts losing concentration).

(3) Determination in the Case of Blink Pattern 3 (Determination Pattern 3)

The user blinks (the user loses concentration).

For example, if the oversight determination module 704 detects blink pattern 1 from the timing of blinking reported by the characteristic determination module 702, the oversight determination module 704 determines that the user of eyeglasses wearable device 400 does not overlook the display data displayed on the display 301 (determination pattern 1).

The oversight determination module 704 can also distinguish the degree of oversight in the display data displayed on the display 301 by the user of eyeglasses wearable device 400 as blink patterns 2 and 3.

For example, if the oversight determination module 704 detects blink pattern 2 from the timing of blinking reported by the characteristic determination module 702, the oversight determination module 704 determines that the user of eyeglasses wearable device 400 starts losing concentration (determination pattern 2) and may instruct the display data output module 703 to display a warning on the display 301 as the second display data in addition to the first display data, or may give an audio warning.

If the oversight determination module 704 detects blink pattern 3 from the timing of blinking reported by the characteristic determination module 702, the oversight determination module 704 determines that the user of eyeglasses wearable device 400 loses concentration (determination pattern 3), and may instruct the display data output module 703 to stop displaying the first display data on the display 301 and resume displaying the first display data from a position a certain time before the stop position.

In this manner, the oversight determination module 704 can determine the degree of oversight of the important display position in the display data displayed on the display 301 by the user of eyeglasses wearable device 400, estimate a mental condition of the user and a condition of oversight in the display data in real time based on the determined degree of oversight, and add and change the display data shown to the user in real time based on a result of the determination.

Figure 10A:
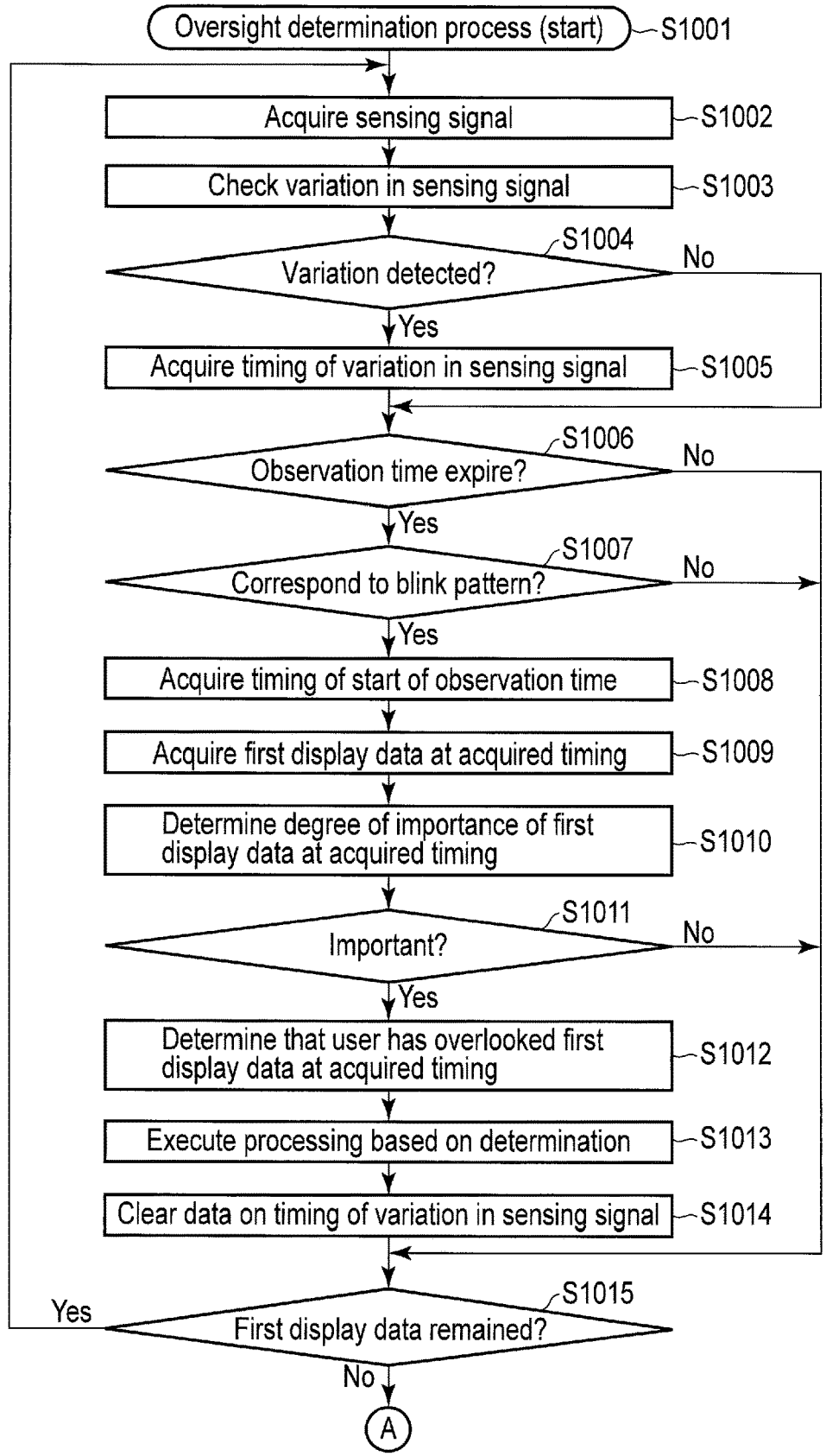
FIG. 10A is a flowchart showing an example of a flow of the oversight determination process by the eyeglasses wearable device of the embodiment in consideration of the blink patterns.
Figure 10B:
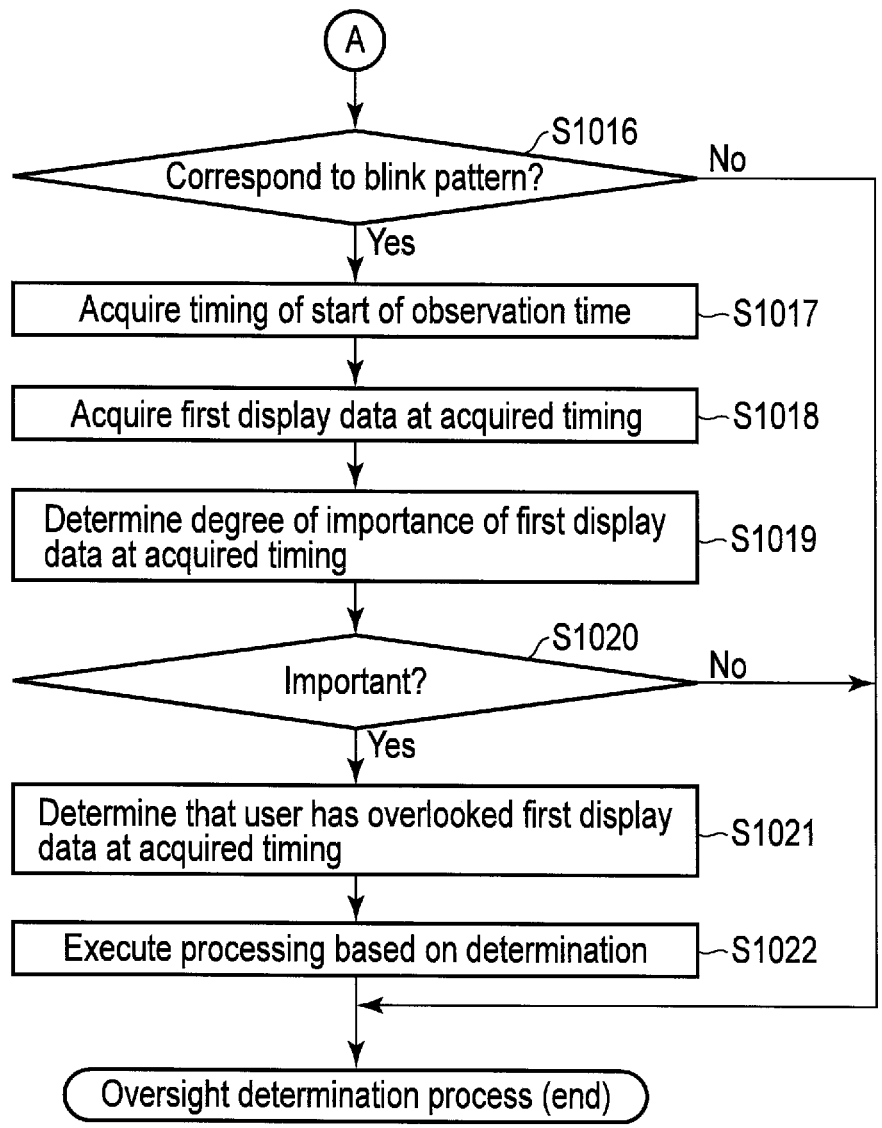
FIG. 10B is a flowchart showing an example of a flow of the oversight determination process by the eyeglasses wearable device of the embodiment in consideration of the blink patterns.
Figure 11:
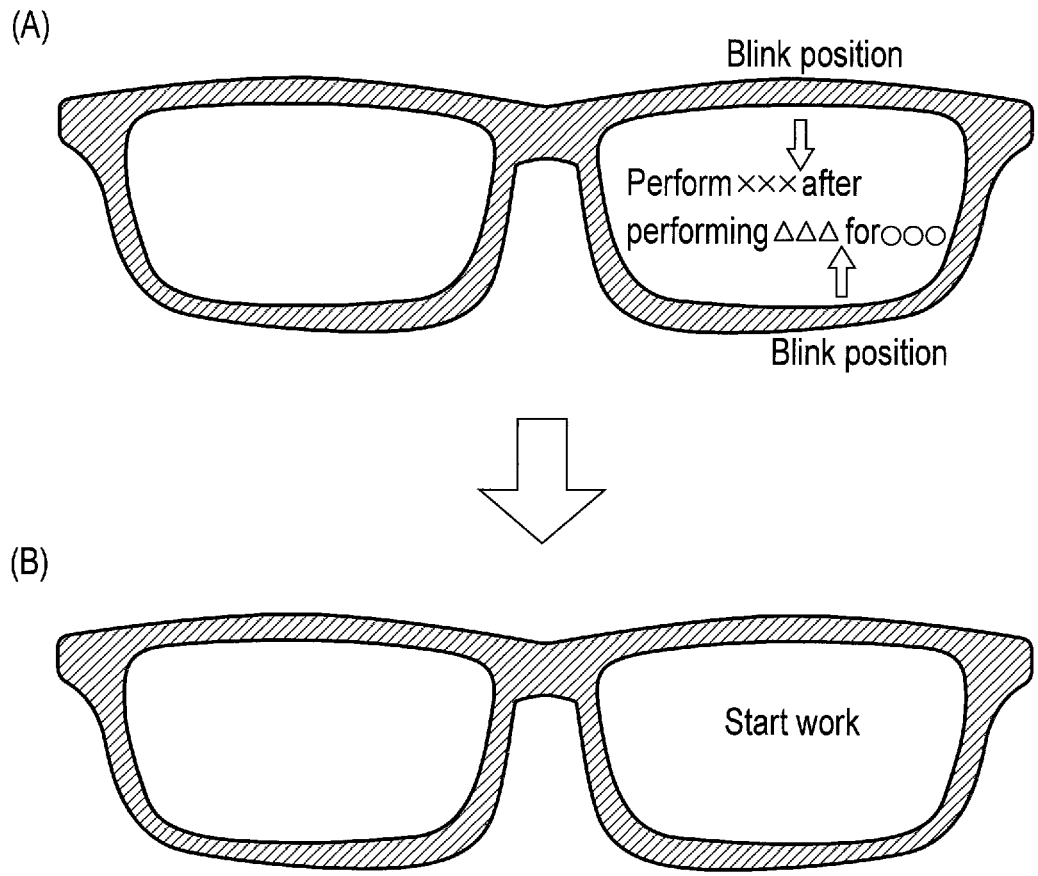
FIG. 11 is an illustration showing an example of the display data displayed on the display based on a result of the oversight determination process by the eyeglasses wearable device of the embodiment.
Figure 12:
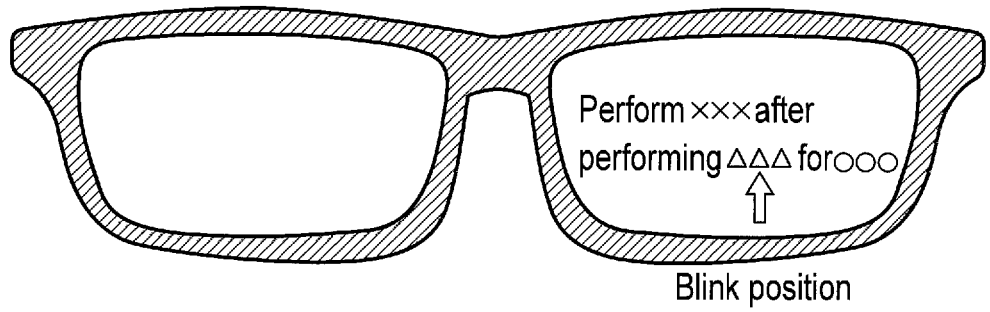
FIG. 12 is an illustration showing an example of the display data displayed on the display based on the result of the oversight determination process by the eyeglasses wearable device of the embodiment.
Figure 12:
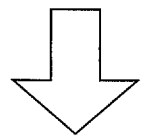
Figure 12:
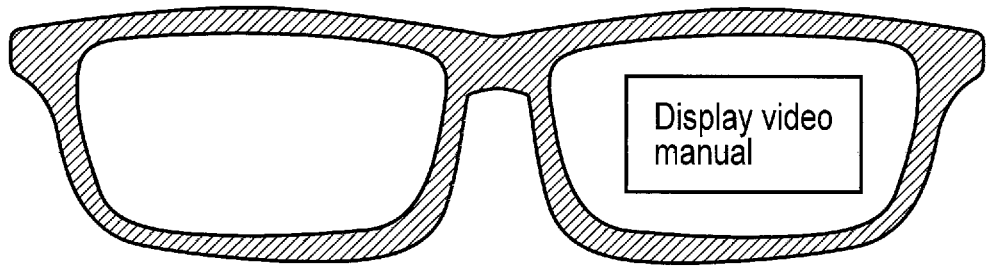
Figure 12:
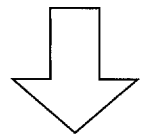
Figure 12:
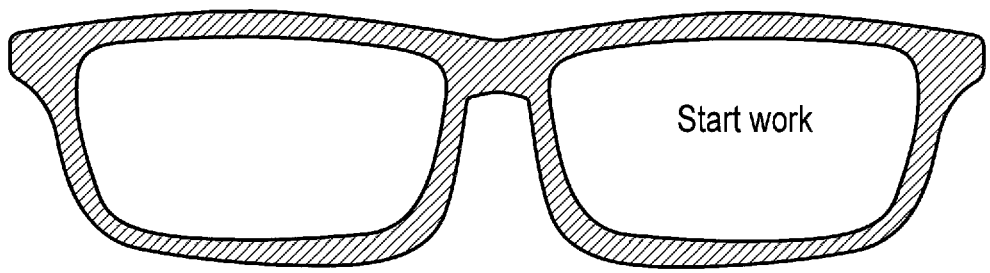

FIG. 10A and FIG. 10B show an example of a flow of the oversight determination process in the case where the oversight determination module 704 takes the blink patterns into consideration when determining whether the user of eyeglasses wearable device 400 has overlooked the important display position in the display data. The process of FIG. 10A and FIG. 10B is different from the process of FIG. 8 in that the determination of blink pattern is included.

After acquiring the timing of variations in ocular potential (S1005), the oversight determination module 704 determines whether an observation time to determine a blink pattern expires (S1006). If the observation time does not expire, the oversight determination module 704 continues acquiring the timing of variations in ocular potential until the observation time expires. If the observation time expires, the oversight determination module 704 determines a blink pattern from the timing of variations in ocular potential acquired within the observation time (S1007). For example, the oversight determination module 704 determines whether blinking specified by the timing of variations in ocular potential corresponds to blink patterns 1 to 3.

If the oversight determination module 704 determines that the blinking corresponds to any of the blink patterns, the oversight determination module 704 acquires timing of the start of the observation time (S1008), acquires the display data output to the display 301 by the display data output module 703 at the acquired timing (S1009), and determines a degree of importance of the display data (S1010). If the oversight determination module 704 determines that the display data is important in S1011, the oversight determination module 704 determines that the user of eyeglasses wearable device 400 has overlooked the display data at the timing acquired in S1009 (S1012). The oversight determination module 704 executes processing based on the determination that the user has overlooked the data (S1013).

The processing based on the determination that the user has overlooked the data (S1013) should preferably be different for the blink pattern determined in S1007. For example, if the oversight determination module 704 detects blink pattern 2, the oversight determination module 704 may instruct the display data output module 703 to display a warning on the display 301 as the second display data while displaying the first display data on the display 301, as described above. If the oversight determination module 704 detects blink pattern 3, the oversight determination module 704 determines that the user of eyeglasses wearable device 400 loses concentration and may instruct the display data output module 703 to stop displaying the first display data on the display 301 and resume displaying the first display data from a position a certain time before the stop position.

After executing the processing based on the determination that the user has overlooked the data (S1013), the oversight determination module 704 clears data of the timing of variations in ocular potential stored during the observation time (S1014). The above process is repeated as long as the first display data remains (S1015). If the display of the first display data is finished, the oversight determination module 704 determines the blink pattern (S1016) and determines whether the user has overlooked the important display data (S1020) based on the timing of variations in ocular potential acquired until the display of the first display data is finished, and executes the processing based on the determination in the same manner as S1013 (S1022).

FIG. 11(A) to FIG. 13(C) show examples of the display data displayed on the display 301 based on the determination of oversight performed by the oversight determination module 704.

FIG. 11(A) shows a case where the user of eyeglasses wearable device 400 blinks while reading an unimportant display position (the beginning or ending of an item of text) in the display data. In this case, the oversight determination module 704 determines that the user does not overlook the display data "Perform xxx after performing ΔΔΔ for ○○○". Therefore, the display data output module 703 displays the next display data "Start work" on the display 301 as shown in FIG. 11(B).

FIG. 12(A) shows a case where the user of eyeglasses wearable device 400 blinks while reading an important display position (the body of an item of text) in the display data. In this case, the oversight determination module 704 determines that the user has overlooked the display data "Perform xxx after performing ΔΔΔ for ○○○". For example, the oversight determination module 704 instructs the display data output module 703 to change the display data to a video manual as shown in FIG. 12(B). In response to the instruction, the display data output module 703 reads the video manual stored in the display DB 705 and displays the video manual on the display 301.

FIG. 13(A) shows a case where the user of eyeglasses wearable device 400 continues blinking (or closing the eyes) while the display data is displayed. In this case, the oversight determination module 704 determines that the user of eyeglasses wearable device 400 does not see the display data "Perform xxx after performing ΔΔΔ for ○○○". For example, the oversight determination module 704 temporarily stops displaying the data on the display 301 as shown in FIG. 13(B). When the oversight determination module 704 determines that the user of eyeglasses wearable device 400 stops blinking (or opens the eyes), the oversight determination module 704 instructs the display data output module 703 to resume displaying the display data from a position a certain time before the data last displayed on the display 301. In response to the instruction by the oversight determination module 704, the display data output module 703 resumes outputting the display data from the position the certain time before the last displayed data.

In this manner, if the oversight determination module 704 determines that the user has overlooked the display data, the oversight determination module 704 can instruct the display data output module 703 to display a message to proceed to the next work or to change the display data in accordance with the user's level of understanding estimated by the nature of blinking of the user. The display data can be thereby displayed on the display 301 in accordance with the condition of oversight of the user of eyeglasses wearable device 400.

The position in the display data displayed on the display 301 that the user of eyeglasses wearable device 400 is reading at the timing of blinking can also be determined by using the sight-line of the user. As described above, the characteristic determination module 702 can estimate the sight-line by monitoring variations in the acquired sensing signal. The oversight determination module 704 can determine the position in the display data displayed on the display 301 that the user is reading by using data on the sight-line.

As shown in FIG. 11(A) to FIG. 13(C), the positions in the display data that the user is reading at the timing of blinking can be estimated based on the data on the sight-line.

The position in the display data that the user is reading at the timing of blinking may be estimated by, for example, using the elapsed time of the displayed data when the display data is video, and using the sight-line when the display data is text (image), and vice versa. Of course, the position in the display data may be estimated by using both the elapsed time and the sight-line.

FIG. 14 is a diagram showing an example of sharing the data displayed on the display 301 with users of other eyeglasses wearable devices via the network by means of the wireless module 405 of eyeglasses wearable device 400. It is assumed that the user of eyeglasses wearable device 110-1 is working while seeing the first display data displayed on the display 301 and the user of eyeglasses wearable device 110-2 is working while seeing the second display data displayed on the display 301. In such a condition, the user of eyeglasses wearable device 110-2 is determined as overlooking the second display data by the oversight determination process of eyeglasses wearable device 110-2 and third display data to indicate a warning is displayed on the display 301. When the third display data is displayed, the wireless module 303 of eyeglasses wearable device 110-2 transmits the third display data via the network such that the third display data can also be displayed on a display 201 of the manager terminal 103 at the same time. In this manner, specified display data can be shared with a specified person in real time by the wireless module 303.

When specified display data is shared with a specified person in real time, data of other sensors 325 and 326 provided in eyeglasses wearable device 400 can also be shared. For example, it is assumed that eyeglasses wearable device 400 comprises an acceleration sensor as sensor 325. By sharing body motion data acquired by the acceleration sensor together with the display data, the shared display data can be complemented and the accuracy of the shared data can be improved. For example, when the shared display data represent a warning and the body motion data acquired by the acceleration sensor indicates motions at a constant frequency, it can be predicted with a high degree of conviction that the user of eyeglasses wearable device 400 is sleeping.

In the above description, when the oversight determination module 704 determines that the user has overlooked the first display data, the second display data is added to the first display data displayed on the display 301 or the other display data is displayed on the display 301 in real time. However, the data displayed on the display 301 need not necessarily changed in real time.

For example, it is assumed that the oversight determination module 704 determines that the user of eyeglasses wearable device 400 has overlooked an important display position in the first display data displayed on the display 301. In this case, the oversight determination module 704 can generate third display data by editing warning data (second display data) into the first data displayed at the timing at which the user of eyeglasses wearable device 400 has overlooked the important display position in the first display data.

The newly generated third display data can be stored in the display DB 705. Therefore, the user of eyeglasses wearable device 400 can display the newly generated third display data on the display 301 as necessary.

For example, when the oversight determination module 704 determines that the user of eyeglasses wearable device 400 has overlooked an important display position in the display data, the oversight determination module 704 may store the combination data of the display data displayed on the display 301 and the timing of oversight in the display DB 705. In addition, such data may be acquired from many users of eyeglasses wearable devices 400 and accumulated in the display DB 705 to be utilized as reference data for future updates of the display data. Data of the other sensors 325 and 326 of eyeglasses wearable device 400 may also be accumulated together in the display DB 705.

For example, if the first display data is display data for training the user of eyeglasses wearable device 400, the user's level of concentration, stress, understanding of the training data and the like can be estimated in real time by detecting variations in sensing signal of ocular potential when the user is seeing the training data. The data may be stored in the data management server 101 via the network by the wireless module 303. Data on the other users who saw the training data may also be stored in the data management server 101.

After the user sees the training data, the user actually does the work and the user's level of understanding of the work is graded based on the progress of the actual work. Data on the user's level of understanding is also stored in the data management server 101. As a result, the data on the level of understanding of the training data and the data on the level of understanding of the actual work can be analyzed together and utilized for future improvement.

For example, if the user of eyeglasses wearable device 400 see the training data and then actually do the work and the user's level of understanding of the work is estimated, a method of estimating can be made more appropriate by analyzing both the data on the level of understanding of the training data and the data on the level of understanding of the actual work stored in the data management server 101. If the analysis result shows that every user has a low level of concentration or understanding in a certain step of the work, it is predicted that there is a problem with the training data and display data displayed during the actual work, and the training data and the display data displayed during the actual work can be improved.

In order to improve the training data and the display data displayed during the actual work, display data including work instructions suitable for each person can be generated. In addition, display data of general work instructions can be generated by gathering the display data including work instructions for each person and extracting commonalities from the data.

The third display data generated based on the first display data is display data used by a worker to do the subsequent work after working with the first display data. Risks in the subsequent work can be avoided and the efficiency can be improved by viewing the display data including previous working conditions.

In the above-described embodiment, a mental condition of the user of eyeglasses wearable device 400 and a condition of oversight in the display data can be estimated in real time by monitoring blinking of the user of eyeglasses wearable device 400.

The working efficiency can be improved by changing the display data shown to the user in real time based on the estimated mental condition and condition of oversight in the display data. Furthermore, since the necessary display data can be shared in real time with the other person concerned via the network, it becomes easier to remotely understand the situation. For example, the manager can easily understand a problem in the work of the user of eyeglasses wearable device 400 in real time. Moreover, the estimated mental condition and condition of oversight in the display data can be accumulated to be utilized as basic data for the subsequent work. For example, the accumulated data can be used when updating the display data and making a schedule of the worker in consideration of the estimated mental condition.

As described above, the embodiment can provide a training device using an eyeglasses wearable device capable of detecting blinking by sensing ocular potential. For example, when training is conducted by text-based instructional video whose content and time axis are predetermined, a position that the user is reading can be estimated in real time by applying the ocular potential sensing function to sensing of eye movements. The level of understanding can be estimated in real time from the timing of the trainee's blinking by means of the training device using the eyeglasses wearable device. The data can be accumulated, recorded and used as first big data.

The level of understanding estimated from practical data of the trainee can be graded, and the grading data can be recorded and used as second big data.

More specifically, for example, estimation and grading data of trainees can be recorded as big data of machine learning, and an estimation engine for estimating the level of understanding can be improved by analyzing the big data. If every trainee has a low level of concentration or understanding in a certain step, it is predicted that there is a problem with the instructional video or text. The instructional video or text can be improved by finding the problem with the instructional video or text. If the accuracy in estimating the level of understanding in real time is improved, a notice or warning can be displayed on the eyeglasses wearable device depending on the trainee's level of understanding or concentration.

According to the present embodiment, in training or actual work, the characteristic determination module determines at least the timing of blinking of the user of the eyeglasses wearable device. The oversight determination module compares the timing of blinking and elapsed time of the display data to determine whether the user has overlooked an important display position. The estimation data in the training can be stored as first big data and the grading data in the actual work can be stored as second big data in the data management server. If the volume of the first and second big data is increased, the estimation engine and the instructional video or text can be improved as described above by analyzing the data by means of the system controller or an analyzer provided separately.

Risks in work can be avoided and working efficiency can be improved if the trainee works as the worker described in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An eyeglasses wearable device comprising:
an eyeglass frame including a right nose pad and a left nose pad;
a first detection electrode positioned on an upper portion of the right nose pad;
a second detection electrode positioned on a lower portion of the right nose pad;
a third detection electrode positioned on an upper portion of the left nose pad;
a fourth detection electrode positioned on a lower portion of the left nose pad;
a display configured to display first data; and
a hardware processor electrically coupled to the first detection electrode, the second detection electrode, the third detection electrode, and the fourth detection electrode, the hardware processor to execute a program configured to:
    detect a blink of the user based on an ocular potential difference between outputs from the first detection electrode and the second detection electrode or an ocular potential difference between outputs from the third detection electrode and the fourth detection electrode;
    detect a first blink pattern, a second blink pattern, or a third blink pattern based on a number of blinks detected within a specific period of time, and
wherein the hardware processor is further configured to
    detect the first blink pattern if the number of blinks detected within the specific period of time is less than a first prescribed number,
    detect the second blink pattern if the number of blinks detected within the specific period of time is less than the first prescribed number and if a number of times that the first blink pattern is detected within a prescribed time period is more than a second prescribed number,
    detect the third blink pattern if the number of blinks detected within the specific period of time is greater than or equal to the first prescribed number,
    determine a timing when the hardware processor detects the second blink pattern or the third blink pattern,
    compare the timing when the hardware processor detects the second blink pattern or the third blink pattern with a period of time when the display displays the first data, and
    detect that the user overlooks the first data if the timing when the hardware processor detects the second blink pattern or the third blink pattern is within the period of time when the display displays the first data.

2. The eyeglasses wearable device of claim 1, wherein when the hardware processor detects the second blink pattern or the third blink pattern, the display is configured to stop displaying the first data and start displaying second data.

3. The eyeglasses wearable device of claim 1, wherein the first data comprises a manual image or a manual text to be shown to the user.

4. The eyeglasses wearable device of claim 2, wherein the second data comprises a repetitive data of the first data or a new instruction data.

5. The eyeglasses wearable device of claim 1, wherein the first data comprises an image or text for providing the user with virtual work training.

6. The eyeglasses wearable device of claim 2, wherein the second data comprises an image or text for displaying a warning or an authorization.

7. The eyeglasses wearable device of claim 2, wherein when the hardware processor detects the second blink pattern or the third blink pattern, the hardware processor changes content of the second data in accordance with a detected blink pattern.

8. The eyeglasses wearable device of claim 1, wherein when the hardware processor detects the second blink pattern or the third blink pattern, the display is configured to stop displaying the first data and start displaying a third data by displaying second data in addition to the first data.

9. The eyeglasses wearable device of claim 1, wherein the hardware processor is further configured to:
    detect a sight-line of the user based on the output outputs from the first detection electrode and the second detection electrode and the outputs from the third detection electrode and the fourth detection electrode; and
    determine whether the user overlooks the first data based on a position read by the user based on the detected sight-line.

10. The eyeglasses wearable device of claim 1, further comprising
    a transceiver configured to share the first data with another user via a network.

11. A method of using an eyeglasses wearable device including a first detection electrode positioned on an upper portion of the right nose pad, a second detection electrode positioned on a lower portion of the right nose pad, a third detection electrode positioned on an upper portion of the left nose pad, a fourth detection electrode positioned on a lower portion of the left nose pad, a display configured to display first data, and a hardware processor electrically coupled to the first detection electrode, the second detection electrode, the third detection electrode, and the fourth detection electrode, the method comprising:
    detecting, by the hardware processor, a blink of the user based on an ocular potential difference between outputs from the first detection electrode and the second detection electrode or an ocular potential difference between outputs from the third detection electrode and the fourth detection electrode;
    detecting, by the hardware processor, a first blink pattern, a second blink pattern, or a third blink pattern based on a number of blinks detected within a specific period of time, wherein the first blink pattern is detected if the number of blinks detected within the specific period of time is less than a first prescribed number, the second blink pattern is detected if the number of blinks detected within the specific period of time is less than the first prescribed number and if a number of times that the first blink pattern is detected within a prescribed time period is more than a second prescribed number, and the third blink pattern is detected if the number of blinks detected within the specific period of time is greater than or equal to the first prescribed number;
    determining a timing when the second blink pattern or the third blink pattern is detected;
    comparing the timing when the second blink pattern or the third blink pattern with a period of time when the display displays the first data; and
    detecting that the user overlooks the first data if the timing when the second blink pattern or the third blink pattern is detected is within the period of time when the display displays the first data.

12. The method of claim 11, wherein responsive to detecting the second blink pattern or the third blink pattern, the method further comprising:
    stopping the displaying of the first data on the display and displaying a second data on the display, the second data being different from the first data.

13. The method of claim 12, wherein the first data comprises a manual image or a manual text to be shown to the user.

14. The method of claim 12, wherein the second data comprises a repetitive data of the first data or a new instruction data.

15. The method of claim 12, wherein the first data comprises an image or text for providing the user with virtual work training.

16. The method of claim 15, wherein the second data comprises an image or text for displaying a warning or an authorization.

17. The method of claim 12, wherein in further response to detecting the second blink pattern or the third blink pattern, the method further comprising:

changing content of the second data in accordance with a detected blink pattern.

18. The method of claim 11, wherein responsive to detecting the second blink pattern or the third blink pattern, the method further comprising:

displaying both the first data and a second data on the display, the second data being a warning that is different from the first data.

19. The method of claim 11 further comprising:

detecting a sight-line of the user based on-the outputs from the first detection electrode and the second detection electrode and the outputs from the third detection electrode and the fourth detection electrode; and determining whether the user overlooks the first data based on a position read by the user based on the detected sight-line.

20. The method of claim 11 further comprising sharing the first data displayed on the display with another user via a network.

* * * * *